US009743362B1

(12) United States Patent
Tian et al.

(10) Patent No.: US 9,743,362 B1
(45) Date of Patent: Aug. 22, 2017

(54) JOINT TRANSMISSION POWER CONTROL METHOD AND TRANSPONDED COMMUNICATION SYSTEM

(71) Applicant: Intelligent Fusion Technology, Inc, Germantown, MD (US)

(72) Inventors: Xin Tian, Niskayuna, NY (US); Genshe Chen, Germantown, MD (US); Khanh Pham, Germantown, MD (US); Erik Blasch, Rome, NY (US)

(73) Assignee: intelligent Fusion Technology, INC, Germantown, MD (US)

( * ) Notice: Subject to any disclaimer, the term of this patent is extended or adjusted under 35 U.S.C. 154(b) by 0 days.

(21) Appl. No.: 15/292,303

(22) Filed: Oct. 13, 2016

(51) Int. Cl.
*H04B 17/02* (2006.01)
*H04B 7/185* (2006.01)
*H04B 17/00* (2015.01)
*H04W 52/24* (2009.01)
*H04W 52/22* (2009.01)

(52) U.S. Cl.
CPC ...... *H04W 52/243* (2013.01); *H04B 7/18513* (2013.01); *H04W 52/223* (2013.01)

(58) Field of Classification Search
CPC .................................................. H04W 52/245
USPC ..................................... 455/522, 67.11, 13.4
See application file for complete search history.

(56) References Cited

U.S. PATENT DOCUMENTS

| | | | | |
|---|---|---|---|---|
| 6,810,233 B2* | 10/2004 | Patsiokas | ............... | H04B 1/207 455/11.1 |
| 6,813,476 B1* | 11/2004 | Brooker | ............. | H04B 7/18513 455/10 |
| 7,020,462 B1* | 3/2006 | Wesel | ................. | H04B 7/2041 455/12.1 |
| 7,046,959 B2* | 5/2006 | Ammar | .............. | H04B 7/18528 455/12.1 |
| 7,099,624 B1* | 8/2006 | Sherman | ................ | H04B 7/216 370/325 |
| 7,599,657 B2* | 10/2009 | Schiff | ................ | H04B 7/18513 455/12.1 |
| 7,603,075 B2* | 10/2009 | Barda | ................ | H04B 7/18528 455/13.1 |
| 7,672,639 B2* | 3/2010 | Vaddiparty | ............. | H04L 67/12 455/12.1 |
| 8,346,162 B1* | 1/2013 | Jayasimha | ......... | H04B 7/18521 455/12.1 |
| 2005/0009467 A1* | 1/2005 | Nuber | ................ | H04B 7/18595 455/12.1 |

(Continued)

OTHER PUBLICATIONS

Lan K. Nguyen, Richard B. Wells and Tho Le-Ngoc "Power Allocation for Shared and Frequency Hopped Transponder," Milcom 2015 Track 1—Waveforms and Signal Processing, 2015 pp. 534-540.

(Continued)

*Primary Examiner* — Tilahun B Gesesse
(74) *Attorney, Agent, or Firm* — Anova Law Group, PLLC

(57) ABSTRACT

A joint transmission power control and a transponder communication system, transmitting a plurality of uplink signals to a bent pipe transponder, combining the plurality of uplink signals to generate a combined downlink signal, transmitting the combined downlink signal to a ground hub, performing an estimate and pre-qualification process by the plurality of down link signals to determine a selected waveform, perform the join transmission power control of uplink margins are satisfied.

20 Claims, 7 Drawing Sheets

(56) References Cited

U.S. PATENT DOCUMENTS

2013/0070666 A1* 3/2013 Miller .................... H04B 7/212
  370/326

OTHER PUBLICATIONS

Yunfei Chen and Norman C. Beaulieu, "Maximum Likelihood Estimation of SNR Using Digitally Modulated Signals," IEEE Transactions on Wireless Communications, vol. 6, No. 1, 210-219, Jan. 2007 pp. 210-219.

David R. Pauluzzi and Norman C. Beaulieu, "A Comparison of SNR Estimation Techniques for the AWGN Channel," IEEE Transactions on Communications, vol. 48, No. 10, 1681-1691, Oct. 2000. pp. 1681-1691.

* cited by examiner

JOINT TRANSMISSION POWER CONTROL METHOD AND TRANSPONDED COMMUNICATION SYSTEM

GOVERNMENT RIGHTS

This invention was made with Government support under Contract No. FA9453-15-C-0401, awarded by the United States Air Force Research Laboratory. The U.S. Government has certain rights in this invention.

TECHNICAL FIELD

The disclosed subject matter generally relates to wireless communication field and, more particularly, relates to a method for joint transmission power control, and a transponded communication system.

BACKGROUND

Uncertainties is inherent in communication systems and especially satellite communication systems, where losses from all sources along the path of a satellite communication (SATCOM) link, e.g., atmospheric loss, antenna depointing loss, are uncertain in nature. To battle uncertainties in SATCOM the common approach is to reserve a sufficient amount of link margin for SATCOM links so that the receiver side SNR is above the required level of the SATCOM waveform with a probability that is larger than a desired link availability level, e.g., 99%. The problem is more challenging in transponded SATCOM system where each SATCOM link includes two segments, i.e., the uplink and the downlink; and multiple SATCOM links and interference are further coupled through the transponder.

Accordingly, it is desirable to provide a method for joint transmission power control, and a transponded communication system.

BRIEF SUMMARY

In accordance with some embodiments of the disclosed subject matter, a method for joint transmission power control, and a transponded communication system are provided.

An aspect of the disclosed subject matter provides a method for joint transmission power control, comprising: transmitting, by a plurality of communication terminals, a plurality of uplink signals to a bent pipe transponder through a plurality of uplinks respectively; combining, by the bent pipe transponder, the plurality of uplink signals to generate a combined downlink signal, and transmitting the combined downlink signal to a ground hub through a combined downlink; extracting, by the ground hub, a plurality of downlink signals from the combined downlink signal, wherein each downlink signal corresponds to one of the plurality of uplink signals and a transponded link, each transponded link is defined as one uplink plus a corresponding downlink from the bent pipe transponder to the ground hub; performing, by the ground hub, a link information estimation and pre-qualification process by using the plurality of downlink signals to determine whether a selected waveform is supported by a corresponding transponded link; and performing, by the ground hub, a joint transmission power control process by using the plurality of downlink signals to determine whether a set of link waveforms corresponding to a plurality of transponded links are supported when required downlink and uplink margins are satisfied.

In some embodiments, performing the link information estimation and pre-qualification process comprises: estimating a combined carrier power to noise density ratio for each transponded link including one uplink and a corresponding downlink; estimating a downlink carrier power to noise density ratio for each downlink, and calculating an uplink carrier power to noise density ratio for each uplink based on the combined carrier power to noise density ratio and the corresponding downlink carrier power to noise density ratio; calculating a maximum uplink carrier power to noise density ratio for each uplink by using the calculated uplink carrier power to noise density ratio, a current transmission power of one communication terminal corresponding to the uplink and a maximum transmission power of the one communication terminal; calculating a maximum total downlink carrier power to noise density ratio at the ground hub by using the estimated downlink carrier power to noise density ratios for the plurality of downlinks, the uplink carrier power to noise density ratios for the plurality of uplinks, and transponder amplifier bandwidth information.

In some embodiments, performing the link information estimation and pre-qualification process further comprises: performing a pre-qualification process to each transponded link by using a required uplink margin, a required downlink margin, and the maximum uplink carrier power to noise density ratio associated with the transponded link, and the maximum total downlink carrier power to noise density ratio.

In some embodiments, performing the joint transmission power control process comprises: evaluating a minimum downlink carrier power to noise density ratio required by the ground hub for each tranponded link; calculating a total downlink carrier power to noise density ratio by using the plurality of minimum downlink carrier power to noise density ratios and downlink margins for the plurality of downlinks; determining whether the total downlink power to noise density ratio is less than the maximum total downlink carrier power to noise density ratio at the ground hub; and in response to determining that the total downlink carrier power to noise density ratio is not less than the maximum total downlink carrier power to noise density ratio at the ground hub, removing at least one uplink from the plurality of uplinks.

In some embodiments, performing the joint transmission power control process further comprises: in response to determining that the total downlink carrier power to noise density ratio is less than the maximum total downlink carrier power to noise density ratio at the ground hub, determining a scalar value associated with each uplink based on the maximum uplink carrier power to noise density ratio, required uplink margin, the minimum downlink carrier power to noise density ratio and required downlink margin of a corresponding transponded link, calculating for each transponded link a revised uplink carrier power to noise density ratio by using the scalar value, the required downlink margin, and the required combined carrier power to noise density ratio, calculating a revised total downlink power to noise density ratio based on the scalar value, the revised uplink carrier power to noise density ratios, and the transponder amplifier bandwidth, determining whether the revised total downlink carrier power to noise density ratio is less than the maximum total downlink carrier power to noise density ratio at the ground hub, and in response to determining that the revised total downlink carrier power to noise density ratio is not less than the maximum total downlink carrier power to noise density ratio at the ground hub, removing at least one uplink from the plurality of uplinks.

In some embodiments, performing the joint transmission power control process further comprises: in response to determining that the revised total downlink carrier power to noise density ratio is less than the maximum total downlink carrier power to noise density ratio at the ground hub, deriving a final uplink carrier power to noise density ratio for each transponded link, evaluating a final total downlink carrier power to noise density ratio based on the derived final uplink carrier power to noise density ratios, the scalar values, and the transponder amplifier bandwidth, evaluating a ratio between the final total downlink carrier power to noise density ratio and the maximum total downlink carrier power to noise density ratio, if the evaluated ratio is greater than one, removing at least one uplink from the plurality of uplinks, and if the evaluated ratio is less than or equal to one, evaluating a transmission power back-off for each uplink.

In some embodiments, the method further comprises: before combining the plurality of uplink signals, amplifying, by the bent pipe transponder, the plurality of uplink signals plus transponder receiver noises, and reducing outband noises by passing the amplified plurality of uplink signals through a plurality of Band Pass Filters respectively; and after combining the plurality of uplink signals and before transmitting the combined downlink signal, amplifying the combined downlink signal by using a Travelling Wave Tube Amplifier.

In some embodiments, the plurality of communication terminals include at least one of a portable satellite communication terminal, an unmanned aircraft satellite communication terminal, a vehicle-borne communication terminal, and a ship-borne communication terminal.

In some embodiments, the set of link waveforms are specified by symbol rate, modulation type, forward error correction coding type, and coding rate; the modulation type at least includes quadrature phase-shift keying, 8 phase-shift keying, and 16 quadrature amplitude modulation; and the forward error correction coding type at least includes Low-density parity-check, BCH codes, and Turbo codes.

In some embodiments, the combined carrier power to noise density ratio for each transponded link is estimated by using a maximum likelihood estimation algorithm.

In some embodiments, each required downlink margin is obtained based on a distribution of a downlink carrier power to noise power spectrum density level; and each required uplink margin is obtained based on a distribution of an uplink carrier power to noise power spectrum density level.

In some embodiments, the distribution of the downlink carrier power to noise power spectrum density level is obtained based at least on a downlink carrier power to noise spectrum density estimation, a free space propagation loss, a downlink weather loss, a downlink antenna de-pointing loss, and a power robbing effect at the bent pipe transponder; the distribution of the uplink carrier power to noise spectrum density level is obtained based at least on an uplink carrier power to noise power spectrum density estimation, an uplink free space propagation loss, an uplink weather loss, an uplink antenna de-pointing loss, and an intermodulation noise at the bent pipe transponder.

Another aspect of the disclosed subject matter provides a transponded communication system, comprising: a plurality of communication terminals configured for transmitting a plurality of uplink signals through a plurality of uplinks respectively; a bent pipe transponder configured for receiving and combining the plurality of uplink signals to generate a combined downlink signal, and transmitting the combined downlink signal through a combined downlink; and a ground hub configured for: receiving the combined downlink signal, extracting a plurality of downlink signals from the combined downlink signal, wherein each downlink signal corresponds to one of the plurality of uplink signals and a transponded link, each transponded link is defined as one uplink plus a corresponding downlink from the bent pipe transponder to the ground hub, performing a link information estimation and pre-qualification process by using the plurality of downlink signals to determine whether a selected waveform is supported by a corresponding transponded link, and performing a joint transmission power control process by using the plurality of downlink signals to determine whether a set of link waveforms corresponding to a plurality of transponded links are supported when required downlink margins and required margins uplink margins are satisfied.

In some embodiments, the ground hub is further configured for: estimating a combined carrier power to noise density ratio for each transponded link including one uplink and a corresponding downlink; estimating a downlink carrier power to noise density ratio for each downlink; calculating an uplink carrier power to noise density ratio for each uplink based on the combined carrier power to noise density ratio and the corresponding downlink carrier power to noise density ratio; calculating a maximum uplink carrier power to noise density ratio for each uplink by using the calculated uplink carrier power to noise density ratio, a current transmission power of one communication terminal corresponding to the uplink and a maximum transmission power of the one communication terminal; and calculating a maximum total downlink carrier power to noise density ratio at the ground hub by using the estimated downlink carrier power to noise density ratios for the plurality of downlinks, the uplink carrier power to noise density ratios for the plurality of uplinks, and transponder amplifier bandwidth information.

In some embodiments, the ground hub is further configured for: obtaining a required downlink margin for each downlink based on a distribution of a downlink carrier power to noise power spectrum density level, wherein the distribution of the downlink carrier power to noise power spectrum density level is obtained based at least on a downlink carrier power to noise spectrum density estimation, a free space propagation loss, a downlink weather loss, a downlink antenna de-pointing loss, and a power robbing effect at the bent pipe transponder; obtaining a required uplink margin for each uplink based on a distribution of an uplink carrier power to noise power spectrum density level, wherein the distribution of the uplink carrier power to noise spectrum density level is obtained based at least on an uplink carrier power to noise power spectrum density estimation, an uplink free space propagation loss, an uplink weather loss, an uplink antenna de-pointing loss, and an intermodulation noise at the bent pipe transponder; and performing a pre-qualification process to each transponded link by using a required uplink margin, a required downlink margin, and the maximum uplink carrier power to noise density ratio associated with the transponded link, and the maximum total downlink carrier power to noise density ratio.

In some embodiments, the ground hub is further configured for: evaluating a minimum downlink carrier power to noise density ratio required by the ground hub for each tranponded link; calculating a total downlink carrier power to noise density ratio by using the plurality of minimum downlink carrier power to noise density ratios and downlink margins for the plurality of downlinks; determining whether the total downlink power to noise density ratio is less than the maximum total downlink carrier power to noise density ratio at the ground hub; and in response to determining that the total downlink carrier power to noise density ratio is not less than the maximum total downlink carrier power to noise density ratio at the ground hub, removing at least one uplink from the plurality of uplinks.

In some embodiments, the ground hub is further configured for: in response to determining that the total downlink carrier power to noise density ratio is less than the maximum total downlink carrier power to noise density ratio at the ground hub, determining a scalar value associated with each uplink based on the maximum uplink carrier power to noise density ratio, required uplink margin, the minimum downlink carrier power to noise density ratio and required downlink margin of a corresponding transponded link, calculating for each transponded link a revised uplink carrier power to noise density ratio by using the scalar value, the required downlink margin, and the required combined carrier power to noise density ratio, calculating a revised total downlink power to noise density ratio based on the scalar value, the revised uplink carrier power to noise density ratios, and the transponder amplifier bandwidth, determining whether the revised total downlink carrier power to noise density ratio is less than the maximum total downlink carrier power to noise density ratio at the ground hub, and in response to determining that the revised total downlink carrier power to noise density ratio is not less than the maximum total downlink carrier power to noise density ratio at the ground hub, removing at least one uplink from the plurality of uplinks.

In some embodiments, the ground hub is further configured for: in response to determining that the revised total downlink carrier power to noise density ratio is less than the maximum total downlink carrier power to noise density ratio at the ground hub, deriving a final uplink carrier power to noise density ratio for each transponded link, evaluating a final total downlink carrier power to noise density ratio based on the derived final uplink carrier power to noise density ratios, the scalar values, and the transponder amplifier bandwidth, evaluating a ratio between the final total downlink carrier power to noise density ratio and the maximum total downlink carrier power to noise density ratio, if the evaluated ratio is greater than one, removing at least one uplink from the plurality of uplinks, and if the evaluated ratio is less than or equal to one, evaluating a transmission power back-off for each uplink.

In some embodiments, the bent pipe transponder is further configured for: before combining the plurality of uplink signals, amplifying the plurality of uplink signals plus transponder receiver noises, and reducing outband noises by passing the amplified plurality uplink signals through a plurality of Band Pass Filters respectively; and after combining the plurality of uplink signals and before transmitting the combined downlink signal, amplifying the combined downlink signal by using a Travelling Wave Tube Amplifier.

In some embodiments, the plurality of communication terminals include at least one of a portable satellite communication terminal, an unmanned aircraft satellite communication terminal, a vehicle-borne communication terminal, and a ship-borne communication terminal.

Other aspects of the disclosed subject matter can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Figure 1:
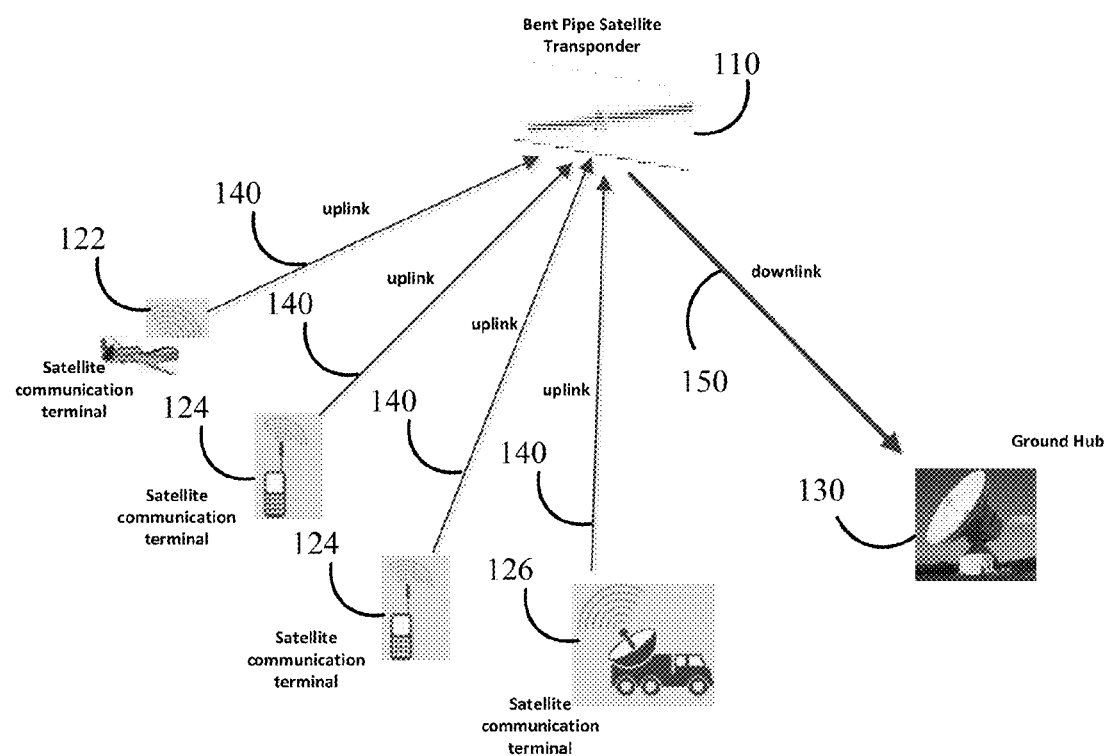
FIG. 1 illustrates a schematic diagram of an exemplary transponded communication system in accordance with some embodiments of the disclosed subject matter.

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a method for joint transmission power control, and a transponded communication system.

The disclosed method is a novel approach for the transmission uplink transmission power control for communication links that share a transponder's transmission power. The disclosed method can be applicable for a disclosed transponded communication system, such as a satellite communication (SATCOM) system with transparent transponders, and a protected frequency hopping SATCOM system, etc.

For transponded SATCOM links, the disclosed method can provide explicit guarantees for uplink link margins (LM) and downlink link margins (DM) against losses from various sources that are uncertain in nature. In some embodiments, the disclosed method can be implemented effectively with information from SATCOM radio frequency (RF) situation awareness for effectively establishing transponded SATCOM links to achieve desired Quality of Service (QoS) requirements.

The disclosed method for joint transmission power control includes a ransponded SATCOM link budget plan that accounts for different uncertain factors, such as losses from the uplink segment, power robbing effects in the transponder, and losses in the downlink segment, etc. As such, the overall transponded link signal power to noise density ratio (SNR) or carrier power to noise density ratio (CNR) can meet the required level with desired probability. Further, SATCOM link margins can be reserved at fixed levels, e.g., 3 dB, regardless of the real-time RF environments, which leads to waste of energy and system capacity for multi-user cases in good conditioned environments, such as a stable link condition with little variation.

In traditional non-Hopping SATCOM system, SATCOM receiver can obtain link quality SNR measurements, which can be used to adjust terminal transmission power level and link margin to achieve desired link performance. In Frequency-Hopping (FH) SATCOM systems, the basic approach for RF situation awareness is to obtain average SNR measurements over many hops, which provides a coarse estimation of overall channel quality. However, more sophisticated per-Hop SNR estimation and fusion can be used to provide detailed channel quality evaluation in support of Dynamic Resource Allocation (DRA) in SATCOM systems, including waveform selection and power control.

Therefore, the disclosed method for joint transmission power control of a transponded SATCOM system is developed to effectively utilize the information from channel SNR measurements to support in-situ decision makings.

It should be noted that, for the sake of simplicity, the following description does not include intermodulation noise and assumes the transponder Travelling Wave Tube Amplifier (TWTA) operates at maximum power or at fixed operating point. However, the intermodulation noise can be included in the disclosed method, and the TWTA can operate at any suitable power.

It also should be noted that, the disclosed method can offer the flexibility of independent uplink and downlink link margin settings for transponded SATCOM links.

Referring to FIG. 1, a schematic diagram of an exemplary transponded communication system is shown in accordance with some embodiments of the disclosed subject matter.

An illustrated, the disclosed transponded communication system can include a bent pipe transponder, multiple remote communication terminals, and a ground hub.

The bent pipe transponder can be loaded on any suitable carrier that can be used as a relay station during a spaceflight or a high-altitude flight. For example, the bent pipe transponder can be a satellite transponder, a space plane transponder, a spacecraft transponder, a space station transponder, a high-altitude hot air balloon transponder, a high-altitude air ship transponder, etc.

In the following description, a bent pipe satellite transponder 110 is used as an example in the disclosed transponded communication system. As such, the disclosed transponded communication system can also be called a transponded satellite communication (SATCOM) system. And the multiple remote communication terminals can be called as satellite communication terminals.

The multiple remote communication terminals can be any suitable terminals that can remotely transmit communication signals through free-space to the bent pipe transponder. In some embodiments, the multiple remote communication terminals can be respectively loaded by any suitable mobile carriers including planes, helicopters, unmanned aircrafts, vehicles, ships, and portable devices, etc., and/or be located at any suitable fixed positions, such as buildings, land-based station towers, offshore oil platforms, etc.

FIG. 1 shows several examples of the satellite communication (SATCOM) terminals including unmanned aircraft satellite communication terminal 122, portable satellite communication terminals 124, and vehicle-borne communication terminal 126, which may not limit the scope of the disclosed remote communication terminals.

As illustrated, the multiple SATCOM terminals can simultaneously transmit communication signals through uplinks 140 to the bent pipe satellite transponder 110. The ground hub 130 can received communication signals transmitted from the bent pipe satellite transponder 110 through a downlink 150.

In some embodiments, the ground hub 130 can include a receiving radar and at least one computer to process the received communication signals.

It should be noted that, the following description of the disclosed method focus on return links (RLs) in the transponded SATCOM system which are the links from the SATCOM terminals 122, 124, and 126 to the ground hub 130 through the bent pipe satellite transponder 110. However, the disclosed method can be applied for not only RLs, but also forward links (FLs) which are links from the ground hub 130 to the SATCOM terminals 122, 124, and 126 through the bent pipe satellite transponder 110.

As illustrated in FIG. 1, each return link comprises two segments. The first segment is the uplink 140 from a SATCOM terminal 122, 124, or 126, to the bent pipe satellite transponder 110. The second segment is the downlink 150 from the bent pipe satellite transponder 110 to the ground hub 130.

In some embodiments, the bent pipe satellite transponder 110 does not demodulate or decode the uplink signals transmitted from the SATCOM terminals 122, 124, and 126 through uplinks 140. Instead, the bent pipe satellite transponder 110 simply amplifies an uplink signal and send it back to the ground hub 130 using the downlink 150.

Figure 2:
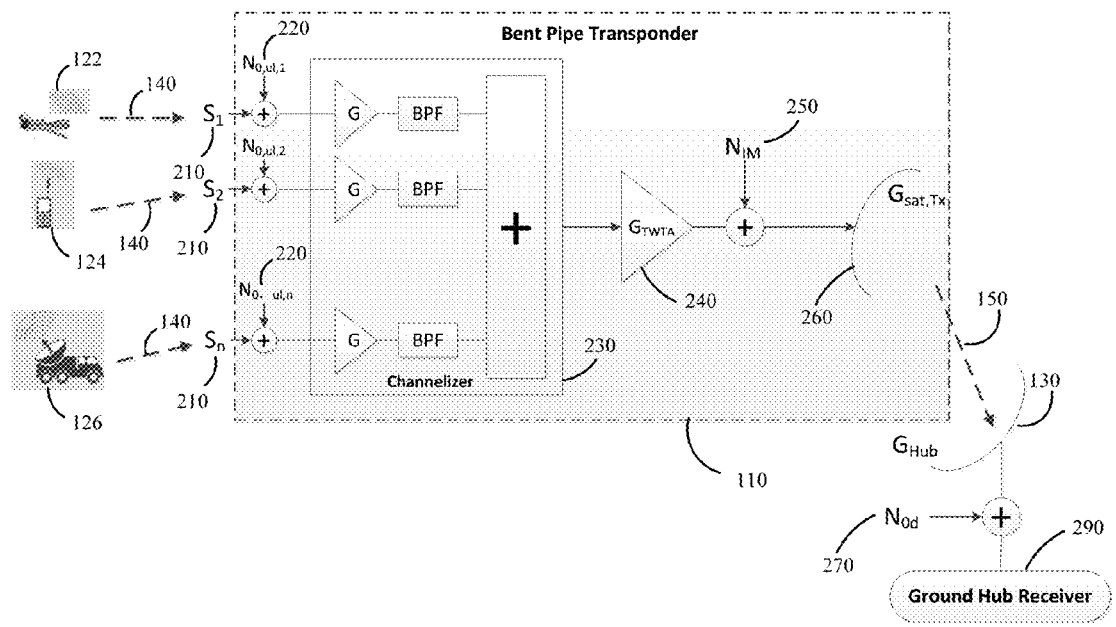
FIG. 2 illustrates a schematic functional diagram of an exemplary bent pipe transponder in accordance with various embodiments of disclosed subject matter.

Referring to FIG. 2, a schematic functional diagram of an exemplary bent pipe transponder is shown in accordance with some embodiments of the disclosed subject matter. Return links with function modules of the bent pipe transponder of the disclosed transponded SATCOM system are illustrated in details.

As illustrated, the uplink signals 210 transmitted from the multiple SATCOM terminals 122, 124 and 126 through uplinks 140 can be received by the bent pipe transponder 110. In some embodiments, the uplink signals 210 including multiple signals $S_1, S_2, \ldots S_n$ actually received by the bent pipe transponder 110 can be mixed with inevitable transponder receiver noises 220, such as noises $N_{0,ul,1}, N_{0,ul,2}, \ldots, N_{0,ul,n}$.

At the bent pipe transponder 110, the uplink signals 210 plus the transponder receiver noises 220 can be processed by a channelizer 230. The channelizer 230 can first amplify the uplink signals 210 plus the transponder receiver noises 220. Then the amplified signals can pass through Band Pass Filters (BPF) to reduce outband noises. Next, the channelizer 230 can rearrange and combine frequency bands for the multiple SATCOM uplinks. The combined signal can be amplified by a Travelling Wave Tube Amplifier (TWTA) 240, which may introduce intermodulation noise ($N_{IM}$) 250 when the TWTA 240 operates in a nonlinear region. After the amplification, the combined downlink signal can be amplified by the satellite transmitter 260, and can be sent through the SATCOM downlink 150 to the ground hub 130.

At the ground hub 130, the downlink signal plus the ground hub receiver noises 270 can be received by ground hub receiver 290.

Figure 3:
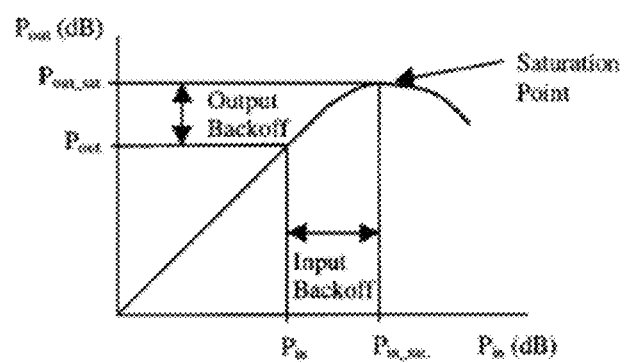
FIG. 3 illustrates exemplary satellite TWTA operational characteristics in accordance with various embodiments of disclosed subject matter.

The total input power to the TWTA is given by $$P_{in} = G\Sigma_{i=1}^{N}\{S_i + N_i\}$$

where G is the transponder gain, $S_i$ is the uplink signal input to the transponder and $N_i = N_{0,u,i}W_i$ is the passband noise power with each SATCOM link.

$$N_{IM} = NPR*P_{NOP}$$

where $P_{\square OP} = G_{TWTA}P_{in}$ is the transponder TWTA's nominal operating point (NOP). The typical satellite TWTA operational characteristics is shown in FIG. 3. When the transponder is operating in a nonlinear region close to the saturation point, the output will be corrupted by intermodulation noises $$P_{out} = G_{TWTA}P_{in} + N_{IM}, \text{ s.t. } P_{out} < P_{out\_sat}$$

With Automatic Level Control (ALC), the transponder gain G is selected such that the transponder work in linear region, such that $N_{IM}$ is very low compared to the signal levels.

For a transponded SATCOM return link, combined C/No level is given by $$C2No_{h,i}^{-1} = C2No_{u,i}^{-1} + C2No_{IM,i}^{-1} + C2No_{d,i}^{-1} \quad (1)$$

where $C2No_{h,i}$ denotes the combined SATCOM link C/No level at the ground hub receiver; $C2No_{u,i}$ is the uplink C/No level; $C2No_{d,i}$ is the downlink C/No level at the hub receiver for link i; and $C2No_{IM}^{-1}$ denotes the signal to intermodulation noise density ratio.

The objective of the disclosed method is to jointly control the terminal transmission of transponded links that pass through the same transponder TWTA, such that, for all the SATCOM return links, the combined C/No at the hub receiver, i.e., $C2No_{h,i}$ can best satisfy the C/No requirements for the selected waveforms, e.g., as shown in Table 1 below.

The SATCOM waveforms can be, in general, specified by symbol rate, modulation type, forward error correction (FEC) coding type, and coding rate. The modulation type includes quadrature phase-shift keying (QPSK), 8 phase-shift keying (PSK), 16 Quadrature amplitude modulation (QAM), etc. The forward error correction (FEC) coding type includes Low-density parity-check (LDPC), BCH codes, Turbo codes, etc.

For a SATCOM return link to operate with a selected waveform, the combined transponded SATCOM link carrier power to noise density ratio C/No need to be above the required threshold. Table 1 shows the required C/No levels for a set of SATCOM waveform supported in DVBS2 standard.

TABLE 1

Required C/N0 levels of SATCOM system Symbol rate, Modulation and coding types following DVB S2 standard

| Symbol Rate (MSPS) | Modulation and coding | Required C/N$_0$ (dB) |
|---|---|---|
| 15/16 | QPSK 1/4 LDPC BCH | 57.4 |
| | QPSK 1/3 LDPC BCH. | 58.7 |
| | QPSK 1/2 LDPC BCH | 60.9 |
| | QPSK 2/3 LDPC BCH | 63.0 |
| | 8PSK 3/5 LDPC BCH | 65.3 |
| | 8PSK 3/4 LDPC BCH | 67.8 |
| | 8PSK 8/9 LDPC BCH | 70.5 |

TABLE 1-continued

Required C/N0 levels of SATCOM system Symbol rate, Modulation and coding types following DVB S2 standard

| Symbol Rate (MSPS) | Modulation and coding | Required C/N$_0$ (dB) |
|---|---|---|
| 15/4 | QPSK 1/4 LDPC BCH | 63.4 |
| | QPSK 1/3 LDPC BCH | 64.7 |
| | QPSK 1/2 LDPC BCH | 66.9 |
| | QPSK 2/3 LDPC BCH | 69.0 |
| | 8PSK 3/5 LDPC BCH | 71.3 |
| | 8PSK 3/4 LDPC BCH | 73.8 |
| | 8PSK 8/9 LDPC BCH | 76.5 |
| 15 | QPSK 1/4 LDPC BCH | 69.4 |
| | QPSK 1/3 LDPC BCH | 70.7 |
| | QPSK 1/2 LDPC BCH | 72.9 |
| | QPSK 2/3 LDPC BCH | 75.0 |
| | 8PSK 3/5 LDPC BCH | 77.3 |
| | 8PSK 3/4 LDPC BCH | 79.8 |
| | 8PSK 8/9 LDPC BCH | 82.5 |
| 60 | QPSK 1/4 LDPC BCH | 75.4 |
| | QPSK 1/3 LDPC BCH | 76.7 |
| | QPSK 1/2 LDPC BCH | 78.9 |
| | QPSK 2/3 LDPC BCH | 81.0 |
| | 8PSK 3/5 LDPC BCH | 83.3 |
| | 8PSK 3/4 LDPC BCH | 85.8 |
| | 8PSK 8/9 LDPC BCH | 88.5 |

In the following description, to present the key aspects of the disclosed method for joint transmission power control, the following assumptions can be made for the sake of simplicity.

(A) It can be assumed that, the uplink noise power spectrum density levels can be considered as the same, i.e. $N_{0,u,i} = N_{0,u}$, which is the case when all uplinks share the same satellite antenna. The general case with different $N_{0,u,i}$ can accommodated with minor modification of the algorithm.

(B) It can be assumed that, the downlink noise power spectrum density levels can be considered as the same, i.e., $N_{0,d,i} = N_{0,d}$, which normally holds for the case of RL since all the downlinks share the system hub receiver.

(C) It can be assumed that, the effect of intermodulation noise can be not considered. As such, equation (1) becomes $$C2No_{h,i}^{-1} = C2No_{u,i}^{-1} + C2No_{d,i}^{-1} \quad (2)$$

With good Automatic Level Control (ALC) the transponder operates in linear region, and the impact of intermodulation noise is negligible. In the case with severe non-linearity, significant level of IM noises should be detectable and treat differently with a specific power control algorithm (D) It can be assumed that the transponder transmit at a fixed maximum power level for the RL downlinks from bent pipe satellite transponder 110 to the ground hub 130. Variations or uncertainties in RL downlink transmission power can be easily accounted by setting enough downlink margin in the disclosed method for joint transmission power control.

(E) It can be assumed that the transponder amplifier bandwidth is known as $BW_{TA}$ (Hz). As a result the uplink noise power robbing effect can be equivalently accounted as a power to uplink receiver noise density ratio of 10log10 $(BW_{TA}) = [BWTA \cdot]_{dB}$, where $[\cdot]_{dB}$ denotes the value of a variable in dB, and $[\cdot]_R$ denotes the regular real value of the variable in the bracket.

(F) It can be assumed that, for each link, the desired level of SATCOM RL throughput is known. Using this Quality of Service (QoS) information, the set of waveforms supporting the throughput can be obtained. The supporting waveforms with the least C/No requirement as shown in Table 1 above, is the most robust supporting mode (MRSM). The disclosed method for joint transmission power control can assume the use of MRSM to provide the highest link margin. The use of other supporting waveforms can be easily accommodated.

In some embodiments, the disclosed method for joint transmission power control can include two steps: an SATCOM link information estimation and pre-qualification stage, and a joint transmission power control stage.

Figure 4:
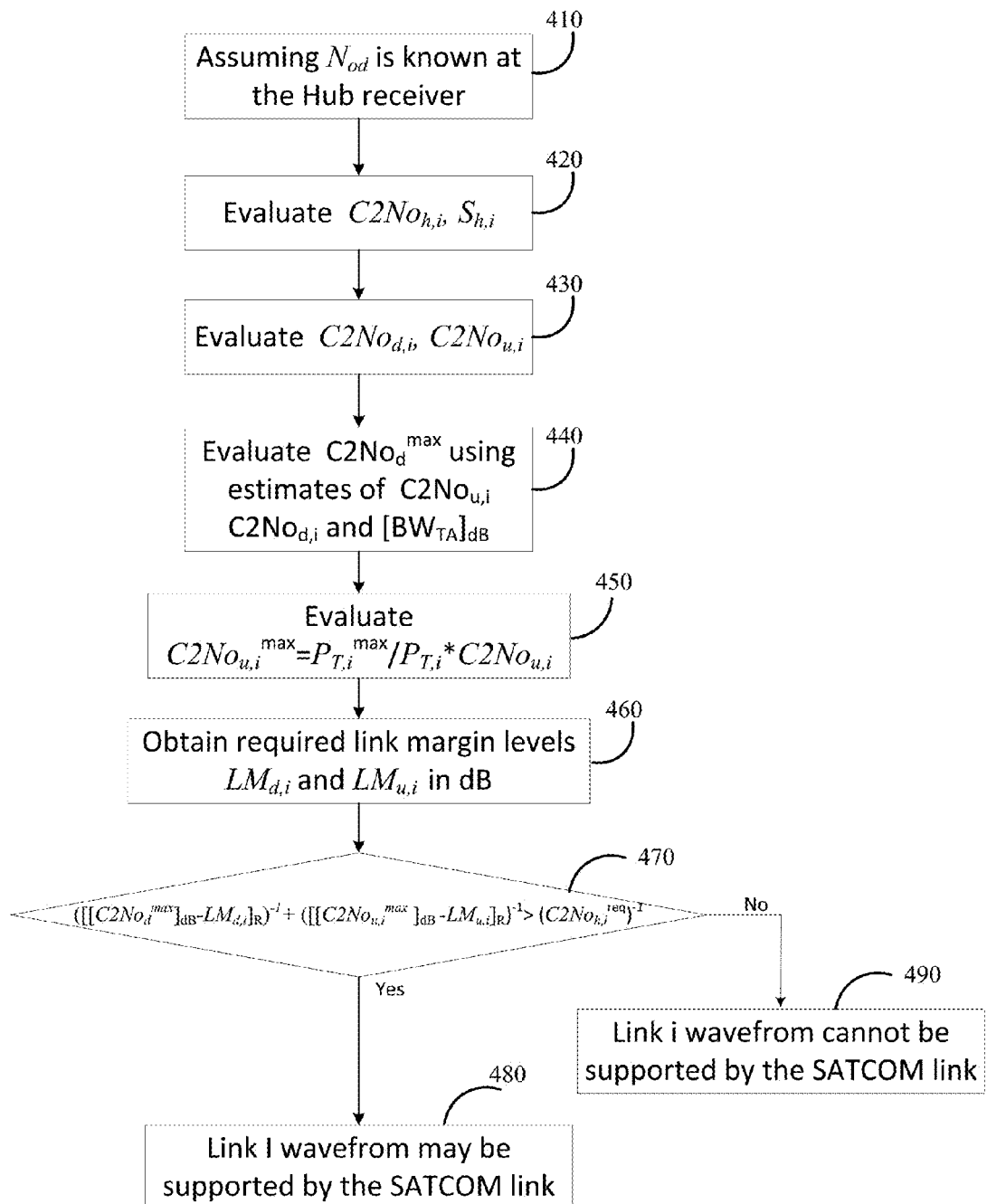
FIG. 4 illustrates an exemplary schematic flowchart of an SATCOM link information estimation and pre-qualification stage in accordance with some embodiments of the disclosed subject matter.

Referring to FIG. 4, an exemplary schematic flowchart of an SATCOM link information estimation and pre-qualification stage is shown in accordance with some embodiments of the disclosed subject matter.

First at step 410, it can be assumed that the noise power spectrum density at the ground hub receiver $N_{0,d}$ is known or partially known by distribution.

Then at step 420, estimates on SATCOM combined transponded link C2No levels $C2No_{h,i}$ and carrier power levels $S_{h,i}$ can be obtained through channel SNR estimation using, e.g., Maximum likelihood estimation algorithm.

At step 430, estimates of $C2No_{d,i}$ and $C2No_{u,i}$ can be then obtained according to $$C2No_{d,i} = S_{h,i}/N_{0d} \quad (3)$$

$$C2No_{u,i}^{-1} = C2No_{h,i}^{-1} - C2No_{d,i}^{-1} \quad (4)$$

Next, at step 440, by using estimates of $C2No_{d,i}$, $C2No_{u,i}$ and transponder amplifier bandwidth information $[BW_{TA}]_{dB}$, the maximum total downlink power to noise density ratio from the transponder amplifier can be evaluated as $C2No_d^{max}$.

At step 450, the estimate of the total signal power level at the Hub $P_{h,s}$ can be obtained using $$[C2No_{u,i}]_R P_{h,s} = \Sigma_{i=1}^N S_{h,i} \quad (5)$$

Note that, all the SATCOM link signals share the downlink power from the same transponder TWTA. The maximum total downlink C/No level from the transponder can be calculated by $$C2No_d^{max} = P_{h,s}/N_{0d} \quad (6)$$

And the maximum uplink SNR for SATCOM link i can be obtained as $$C2No_{u,i}^{max} = C2No_{u,i} P_{T,i}^{max}/P_{T,i} \quad (7)$$

where $P_{T,i}^{max}$ is the maximum transmission power from terminal i and $P_{T,i}$ is the current terminal transmission power.

At step 460, based on the downlink and uplink C2No level estimates, desired link margin for the downlink C2No as $LM_{d,i}$ and $LM_{u,i}$ can be evaluated, such that the true value of downlink and uplink C2No are above $[C2No_{d,i}]_{dB} - LM_{d,i}$ and $[C2No_{u,i}]_{dB} - LM_{u,i}$ with probabilities that are meet the desired threshold.

It should be noted that $LM_{d,i}$ and $LM_{u,i}$ can be properly evaluated by any suitable algorithm and available to the disclosed method for joint transmission power control. Note that, two separate link margins can be set for uplink and downlink instead of just one combined link margin. The reason for this is that factors contributes to the loss of uplink and downlink C2No are different as the examples shown in Table 2 below.

TABLE 2

Factors that affect uplink and downlink C2No levels

| | Uplink $C2No_{u,i}$ loss | Downlink $C2No_{d,i}$ loss |
|---|---|---|
| Uplink free space propagation loss | Yes | No |
| Uplink weather loss | Yes | No |
| Uplink antenna de-pointing losses | Yes | No |
| Downlink free space propagation loss | No | Yes |
| Downlink weather loss | No | Yes |
| Downlink antenna de-pointing losses | No | Yes |
| Power robbing effect at transponder by other signals and interferences | No | Yes |
| Added noises, e.g., IM noises at the transponder | Yes | No |

As a result, the uncertainties involved with these factors illustrated in Table 2 are different and independent. Therefore, the setting of the uplink margin and downlink margin independently according to the appropriate levels of uncertainties is crucial to effectively guarantee the overall link quality.

Next, at step 470, a pre-qualification check can be performed for each link and the selected waveform type $$[[C2No_{u,i}^{max}]_{dB} - LM_{u,i}]_R^{-1} + [[C2No_d^{max}]_{dB} - LM_{u,i}]_R^{-1} < C2No_{req,i}^{-1} \quad (8)$$

where $[C2No_{req,i}]_{dB}$ is the required level of C2No in dB for the waveform to satisfy the link throughput requirement as described above in connection with Table 1.

If the inequality (8) is satisfied ("Yes" at step 470), it can be determined at step 480 that the selected waveform with the desired link margins may be supported by the transponded link. If the inequality (8) is not satisfied ("No" at step 470), it can be determined at step 490 that the selected waveform and link margins cannot be supported by the transponded link.

Figure 5:
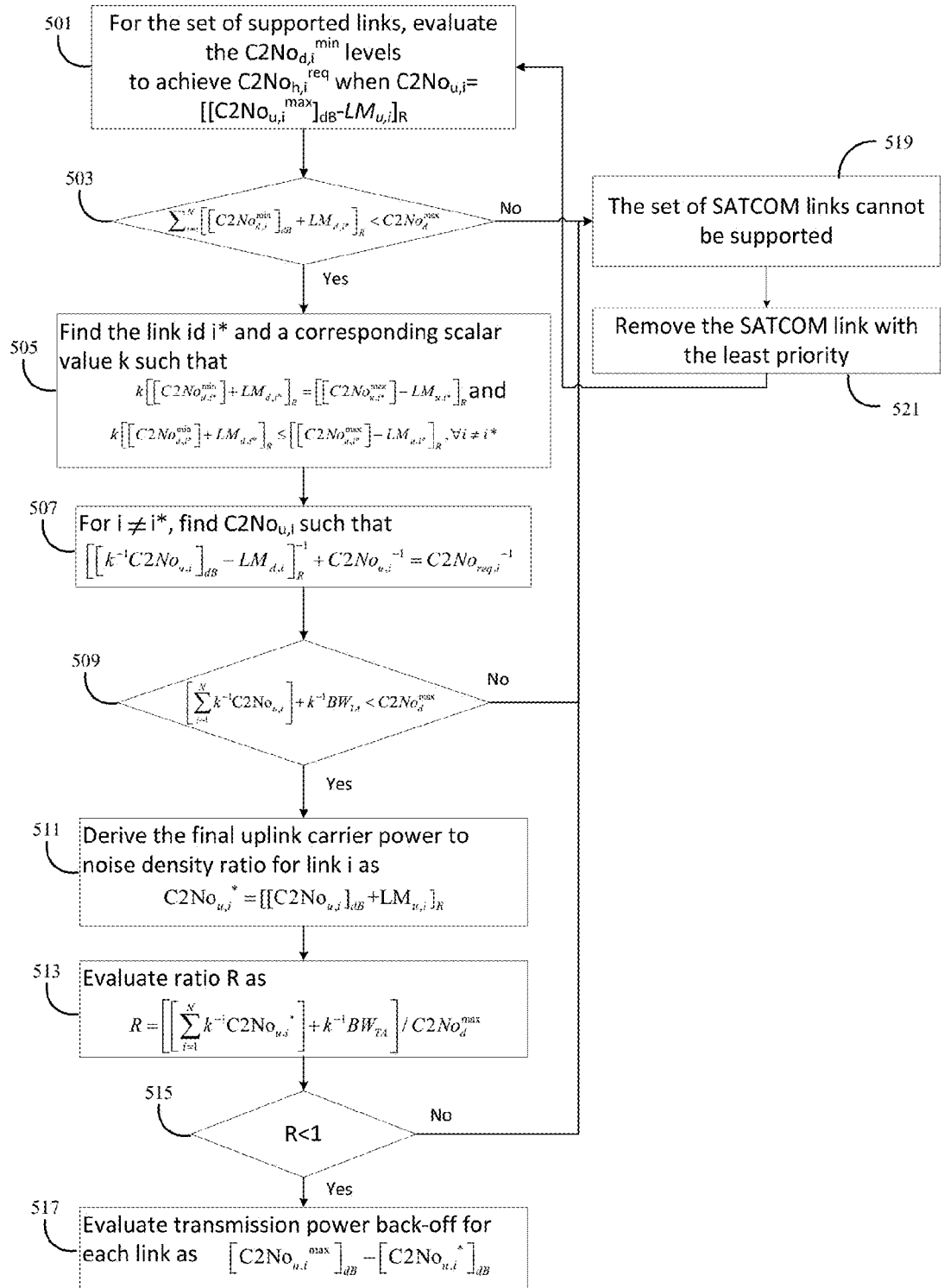
FIG. 5 illustrates an exemplary schematic flowchart of a joint transmission power control stage in accordance with some embodiments of the disclosed subject matter.

Referring to FIG. 5, an exemplary schematic flowchart of a joint transmission power control stage is shown in accordance with some embodiments of the disclosed subject matter. As illustrated, the second stage for joint transmission power control can include the following steps.

In the first step 501, the minimum signal power level at the ground hub required for each SATCOM link is evaluated from the following equation $$C2No_{d,i}^{min} = [C2No_{req,i}^{-1} - [[C2No_{u,i}^{max}]_{dB} - LM_{u,i}]_R^{-1}]^{-1} \quad (9)$$

At step 503, it can be checked whether the following condition is satisfied $$\Sigma_{i=1}^N [[C2No_{d,i}^{min}]_{dB} + LM_{d,i}]_R < C2No_d^{max} \quad (10)$$

In the inequality (10) is not satisfied ("No" at step 503), it can be determined that the waveform C2No and link margin requirements of the set of transponded links cannot be satisfied at the same time. Therefore the set of SATCOM links cannot be supported. Thus, one or some of the link with the least priority needs to be removed at step 521. For example, an SATCOM link with the least priority can be removed.

If the inequality (10) is satisfied ("Yes" at step 503), the SATCOM index i* and the scalar value k can be found at step 505 such that $$k[[C2No_{d,i*}^{min}]_{dB}+LM_{d,i*}]_R=[[C2No_{u,i*}^{max}]_{dB}-LM_{u,i*}]_R \quad (5)$$

and $$k[[C2No_{d,i}^{min}]_{dB}+LM_{d,i}]_R \leq [[C2No_{u,i}^{max}]_{dB}-LM_{u,i}]_R \ \forall i \neq i* \quad (11)$$

At step 507, for links $i \neq i*$, $C2No_{u,i}$ can be found such that $$[[k^{-1}C2No_{u,i}]_{dB}-LM_{d,i}]_R^{-1}+C2No_{u,i}^{-1}=C2No_{req,i}^{-1} \quad (13)$$

Then at step 509, it can be checked whether the following condition satisfied $$\left[\sum_{i=1}^{N}k^{-1}C2No_{u,i}\right]+k^{-1}BW_{TA}<C2No_d^{max} \quad (13)$$

If inequality (13) is not true ("No" at step 509), it can be determined at step 519 that the set of transponded links and required link margin requirements cannot be supported. Therefore the set of SATCOM links cannot be supported. Thus, one or some of the link needs to be removed or waveform/link margin requirements should be changed at step 521. For example, an SATCOM link with the least priority can be removed.

Once inequality (13) is true ("Yes" at step 509), the following step 511 is made to derive the final uplink C2No level that satisfy the uplink margin requirements.

$$C2No_{u,i}^*=[[C2No_{u,i}]_{dB}+LM_{u,i}]_R \quad (14)$$

Then at steps 513 and 515, R value can be evaluated and compared to value 1

$$R=\left[\left[\sum_{i=1}^{N}k^{-1}C2No_{u,i}^*\right]+k^{-1}BW_{TA}\right]\bigg/C2No_d^{max} \quad (15)$$

$$=\left[\left[\sum_{i=1}^{N}C2No_{d,i}^*\right]+k^{-1}BW_{TA}\right]\bigg/C2No_d^{max}$$

If R is greater than 1 ("No" at step 515), it can be determined at step 519 that the set of link waveforms and link margin requirements cannot be satisfied simultaneously. Therefore the set of SATCOM links cannot be supported. Thus, one or some of the link needs to be removed or waveform/link margin requirements should be changed at step 521. For example, an SATCOM link with the least priority can be removed.

If R is small than 1("Yes" at step 515), it can be determined at step 517 that, the set of link waveforms and up and down link margin requirements for all links can be simultaneously satisfied. The transmission power back-off for each link can be evaluated as $[C2No_{u,i}^{max}]_{dB}-[C2No_{u,i}^*]_{dB}$ The additional downlink margin protection of $[R^{-1}]_{dB}$ can be also available for the set of links. The additional downlink margin can be leverage to counter act power robbing effects from unpredictable interferences to provide extra robustness in complex RF environment.

It should be noted that, the disclosed method for joint transmission power control has many important features. For example, its operation can rely entirely on information obtained from SATCOM terminal receiver and transmitter. No additional information on gains and losses from up or downlink links is required, which make it very applicable to real world SATCOM systems Further, the power robbing effect among multiple SATCOM links sharing the transponder amplifier can be automatically handled by the disclosed method. That is, strong uplinks can automatically backoff their transmission power to accommodate weak uplinks.

Additionally, the uplink and downlink margins for SATCOM links can be set based on information from RF situation awareness. The overall link C2No requirements can be satisfied with desired probability levels.

To show the performance of the disclosed method, a simple scenario with two transponded return links can be simulated with the following parameters. The transponder satellite is assumed to be at geosynchronous equatorial orbit (GEO). Table 3 and Table 4 below illustrate the assumed uplink and downlink information.

TABLE 3

Basic uplink properties assumed in the demonstration case

| Uplink properties | Link 1 | Link 2 |
|---|---|---|
| Carrier frequency (GHz) | 30 | 30 |
| Distance (Km) | 39590.6 | 39008.9 |
| Free Space Propagation Loss (dB) | 213.9 | 213.81 |
| Transmitter Antenna Gain (dB) | 27 | 27 |
| Maximum transmission power (W) | 12 | 5 |
| Receiver Antenna Gain (dB) | 53 | 53 |
| Receiver Noise temperature (K) | 500 | 500 |

TABLE 4

Basic downlink properties assumed in the demonstration case

| Downlink properties (SAT to Hub) | |
|---|---|
| Carrier frequency (GHz) | 30 |
| Distance (Km) | 39605.2 |
| Free Space Propagation Loss (dB) | 213.9 |
| Transmitter Antenna Gain (dB) | 60 |
| Transponder downlink amplifier power (W) | 20 |
| Transponder downlink amplifier bandwidth (MHz) | 125 |
| Receiver Antenna Gain (dB) | 60 |
| Hub Receiver Noise temperature | 800 |

In the following demonstration, to satisfy certain throughput requirements, waveforms are selected for both links as shown in Table 5. It also shows the uplink and downlink margin requirements assumed to account for uncertainties in up and down link losses.

TABLE 5

Waveform and link margin settings assumed in the demonstration case

| | Link 1 | Link 2 |
|---|---|---|
| Symbol rate (MSPS) | 15/4 | 15 |
| Modulation | QPSK | QPSK |
| Coding | LDPC + BCH 2/3 | LDPC + BCH1/2 |
| $C2No_{req}$ (dB) | 68.89 | 72.76 |
| Throughput (kbps) | 4218.75 | 12656.25 |
| $LM_u$ (dB) | 3 | 1.5 |
| $LM_d$ (dB) | 3 | 3 |

Figures 6, 7A:
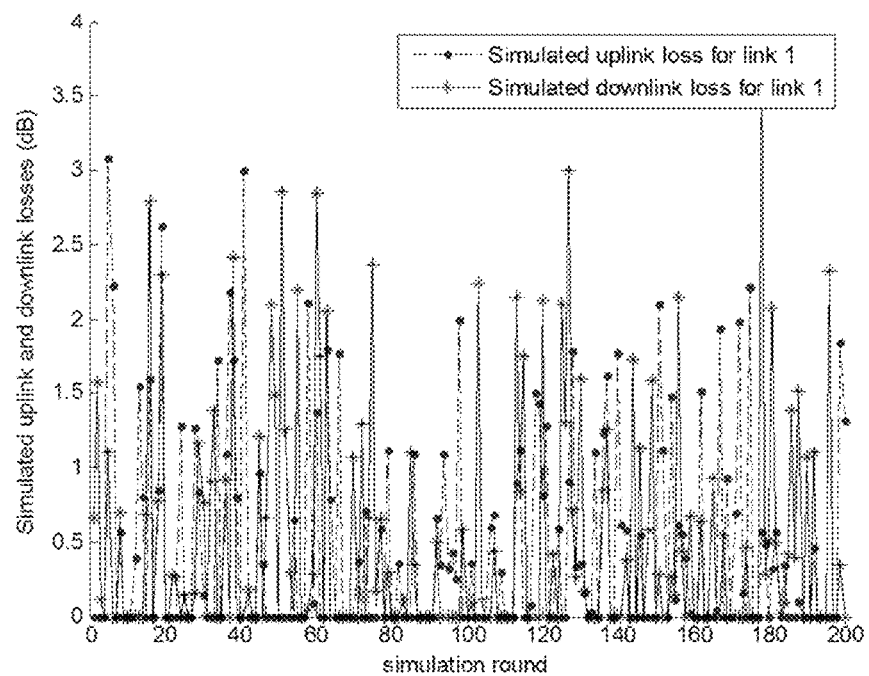
FIG. 6 illustrates exemplary simulation inputs and joint transmission power control results in accordance with various embodiments of present disclosure.
FIGS. 7A and 7B illustrate simulated up and downlink losses for an exemplary double-link transponded communication system by using joint transmission power control in accordance with various embodiments of present disclosure.

Referring to FIG. 6, exemplary simulation inputs and joint transmission power control results are illustrated in accordance with some embodiments of the disclosed subject matter. The scenario inputs and joint transmission power control results for the demonstration case using the "IFT joint power control tool for transponded SATCOM links."

The first row of list boxes in FIG. 6 shows the scenario inputs including for all links the maximum $C2No_u$ levels as described above in connection with equation (7), required C2No levels by the selected waveform, Minimum level of downlink C2No as described above in connection with equation (9), percentage of the minimum $C2No_d$ vs the $C2No_d^{max}$ and the required uplink margins and downlink margins.

The second row of list boxes in FIG. 6 shows the results of the joint power control, including "C2Nou (dB)" as described above in connection with equation (14), "C2Nou backoff (dB)" that shows the backoff of equation (14) from the maximum transmission power level, "C2Nod" which is the resulting downlink C2No for each link, and the "Resulting Percentage" that shows the value of $C2No_{d,i}^*/C2No_d^{max}$.

The final value of R as described above in connection with equation (15) and the additional downlink margin $[R^{-1}]_{dB}$=24.3 dB are shown left to "C2Nod margin in dB" in FIG. 6.

To verify the performance of the disclosed method for joint transmission power control, the transponded link end-to-end C2No can be simulated with random uplink and downlink losses added. The random losses were generated such that
$Pr(L_{u,i} \le LM_{u,i})$=0.99 and $Pr(L_{d,i} \le LM_{d,i})$=0.99, where $Pr(\cdot)$ means the probability of an event, $L_{u,i}$ is the simulated random uplink loss in dB for link i, and $L_{d,i}$ is the simulated random downlink loss in dB for link i.

Figure 7B:
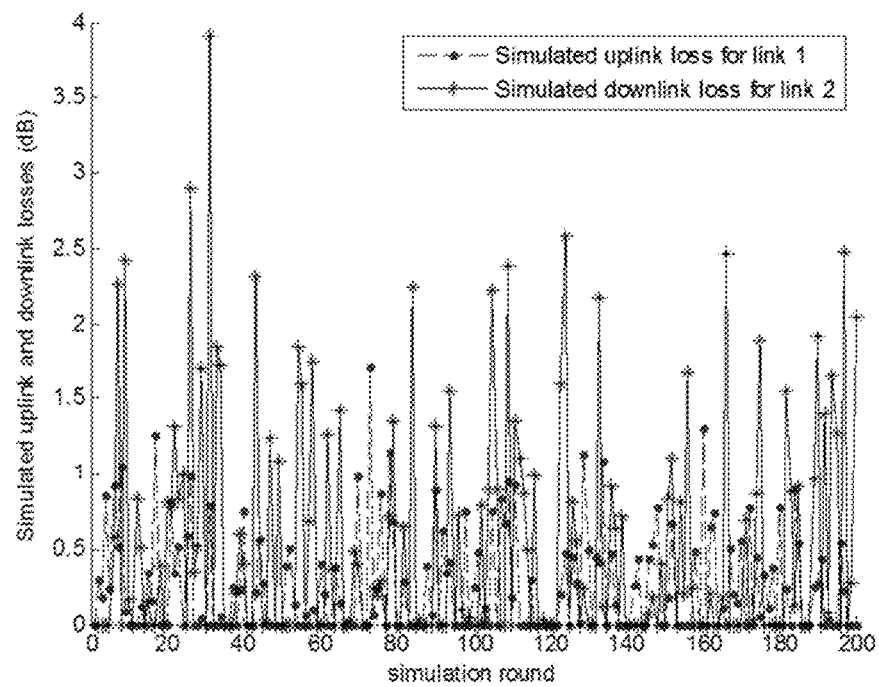
Figure 8A:
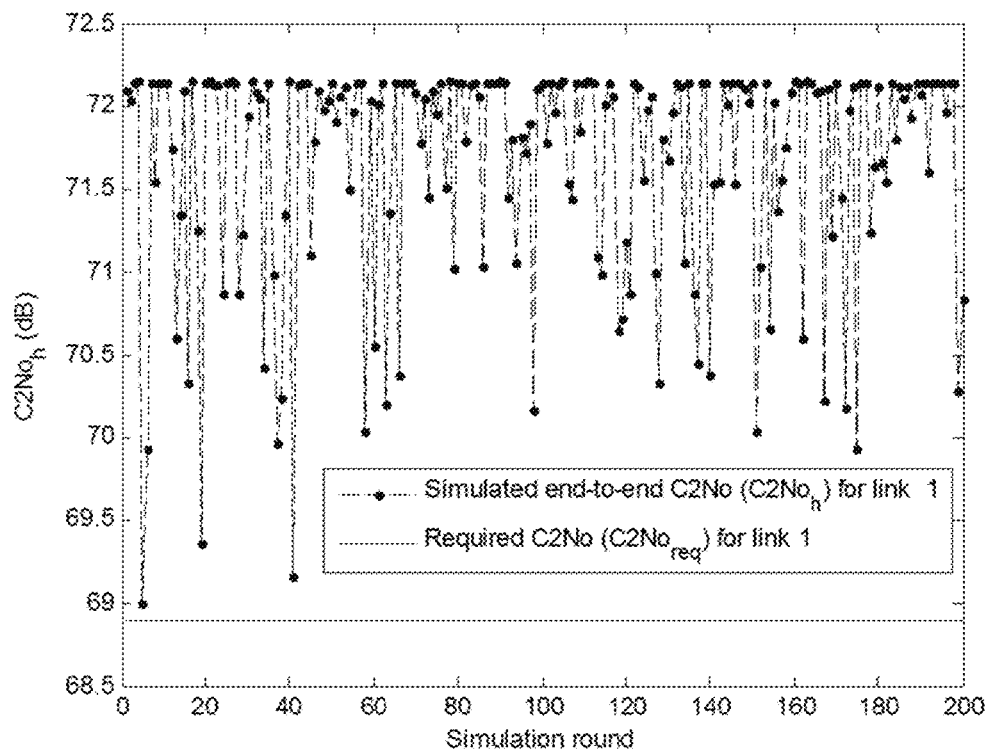
FIGS. 8A and 8B illustrate simulated end-to-end $C2No_{h,i}$ values and the corresponding $C2No_{req}$ values for the exemplary double-link transponded communication system by using joint transmission power control in accordance with various embodiments of present disclosure.
Figure 8B:
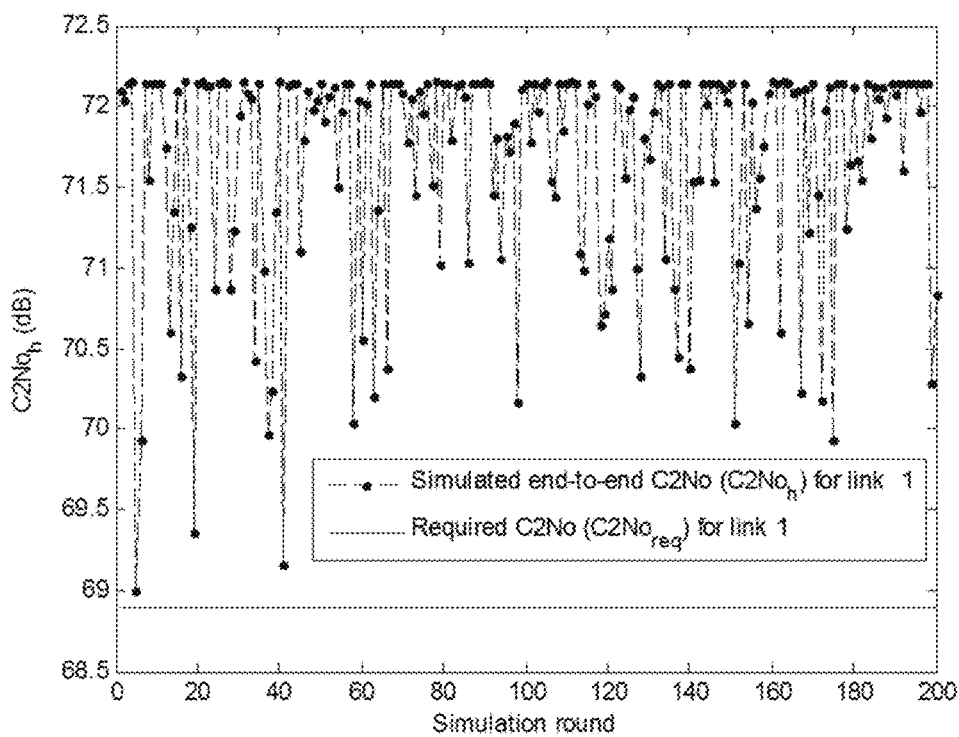

Referring to FIGS. 7A and 7B, the simulated up and downlink losses in dB for link 1 and link 2 respectively in 200 simulations are shown in accordance with some embodiments of the disclosed subject matter. FIGS. 8A and 8B illustrate the end-to-end $C2No_{h,i}$ values in dB for link 1 and link 2 respectively after deducting the extract downlink margin from the algorithm $[R^{-1}]_{dB}$=24.3198 dB, and the corresponding $C2No_{req}$ values required by the waveform.

It can be seen that the simulated $C2No_{h,i}$ is above the required threshold with high probabilities, which verifies that the disclosed method for joint transmission power control with appropriate link margins can be able to effectively combat uncertain random downlink and uplink losses.

Figure 9:
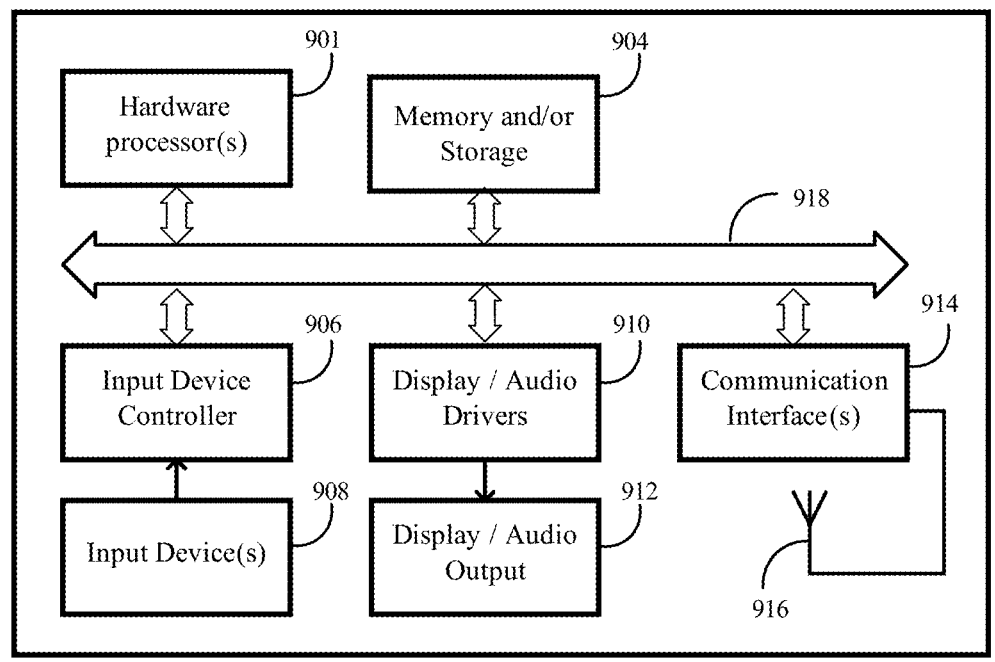
FIG. 9 is a schematic diagram of exemplary hardware of an ground hub in a transponded communication system in accordance with some embodiments of the disclosed subject matter.

Referring to FIG. 9, a schematic diagram of exemplary hardware of an ground hub in the transponded communication system is shown in accordance with some embodiments of the disclosed subject matter.

As illustrated in the exemplary hardware 900, such hardware can include at least one hardware processor 901, memory and/or storage 904, an input device controller 906, an input device 908, display/audio drivers 910, display and audio output circuitry 912, communication interface(s) 914, an antenna 916, and a bus 918.

The at least one hardware processor 901 can include any suitable hardware processor(s), such as microprocessor, micro-controller, a central process unit, graphics processing unit, digital signal processor, array processor, vector processor, dedicated logic, and/or any other suitable circuitry for controlling the functioning of a general purpose computer or special purpose computer in some embodiments.

In some embodiments, the at least one hardware processor 901 can implement or execute various embodiments of the disclosed subject matter including one or more method, steps and logic diagrams. For example, as described above in connection with FIGS. 4 and 5, the at least one hardware processor 901 can perform at least the steps of image partitions and classification visualization, etc.

The steps of the disclosed method in various embodiments can be directly executed by a combination of the at least one hardware processor 901 and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the memory and/or storage 904. The at least one hardware processor 901 can implement the steps of the disclosed method by combining the hardware and the information read from the memory and/or storage 904.

Memory and/or storage 904 can be any suitable memory and/or storage for storing programs, data, media content, comments, information of users and/or any other suitable content in some embodiments. For example, memory and/or storage 904 can include random access memory, read only memory, flash memory, hard disk storage, optical media, and/or any other suitable storage device.

Input device controller 906 can be any suitable circuitry for controlling and receiving input from one or more input devices 908 in some embodiments. For example, input device controller 906 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 910 can be any suitable circuitry for controlling and driving output to one or more display and audio output circuitries 912 in some embodiments. For example, display/audio drivers 910 can be circuitry for driving an LCD display, a speaker, an LED, and/or any other display/audio device.

Communication interface(s) 914 can be any suitable circuitry for interfacing with one or more communication networks. For example, interface(s) 914 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Antenna 916 can be any suitable one or more antennas for wirelessly communicating with a communication network in some embodiments. For example, as shown in FIG. 1, antenna 916 can be a ground hub receiver 290 that can receive downlink signals from a ben pipe transponder 110.

Bus 918 can be any suitable mechanism for communicating between two or more of components 901, 904, 906, 910, and 914 in some embodiments. Bus 918 may be an ISA bus, a PCI bus, an EISA bus, or any other suitable bus. The bus 918 can be divided into an address bus, a data bus, a control bus, etc. The bus 918 is represented as a two-way arrow in FIG. 9, but it does not mean that it is only one type bus or only one bus.

Any other suitable components not shown in FIG. 9 can be included in hardware 900 in accordance with some embodiments. Any unnecessary components shown in FIG. 9 may also be omitted in hardware 900 in accordance with some other embodiments.

In some embodiments, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a method for joint transmission power control, and a transponded communication system are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for joint transmission power control, comprising:

transmitting, by a plurality of communication terminals, a plurality of uplink signals to a bent pipe transponder through a plurality of uplinks respectively;

combining, by the bent pipe transponder, the plurality of uplink signals to generate a combined downlink signal, and transmitting the combined downlink signal to a ground hub through a combined downlink;

extracting, by the ground hub, a plurality of downlink signals from the combined downlink signal, wherein each downlink signal corresponds to one of the plurality of uplink signals and a transponded link, each transponded link is defined as one uplink plus a corresponding downlink from the bent pipe transponder to the ground hub;

performing, by the ground hub, a link information estimation and pre-qualification process by using the plurality of downlink signals to determine whether a selected waveform is supported by a corresponding transponded link; and performing, by the ground hub, a joint transmission power control process by using the plurality of downlink signals to determine whether a set of link waveforms corresponding to a plurality of transponded links are supported when required downlink margins and required uplink margins are satisfied.

2. The method of claim 1, wherein performing the link information estimation and pre-qualification process comprises:

estimating a combined carrier power to noise density ratio for each transponded link including one uplink and a corresponding downlink;

estimating a downlink carrier power to noise density ratio for each downlink;

calculating an uplink carrier power to noise density ratio for each uplink based on the combined carrier power to noise density ratio and the corresponding downlink carrier power to noise density ratio;

calculating a maximum uplink carrier power to noise density ratio for each uplink by using the calculated uplink carrier power to noise density ratio, a current transmission power of one communication terminal corresponding to the uplink and a maximum transmission power of the one communication terminal; and calculating a maximum total downlink carrier power to noise density ratio at the ground hub by using the estimated downlink carrier power to noise density ratios for the plurality of downlinks, the uplink carrier power to noise density ratios for the plurality of uplinks, and transponder amplifier bandwidth information.

3. The method of claim 2, wherein performing the link information estimation and pre-qualification process further comprises:

performing a pre-qualification process to each transponded link by using a required uplink margin, a required downlink margin, and the maximum uplink carrier power to noise density ratio associated with the transponded link, and the maximum total downlink carrier power to noise density ratio.

4. The method of claim 3, wherein performing the joint transmission power control process comprises:
evaluating a minimum downlink carrier power to noise density ratio required by the ground hub for each tranponded link;
calculating a total downlink carrier power to noise density ratio by using the plurality of minimum downlink carrier power to noise density ratios and downlink margins for the plurality of downlinks;
determining whether the total downlink power to noise density ratio is less than the maximum total downlink carrier power to noise density ratio at the ground hub; and
in response to determining that the total downlink carrier power to noise density ratio is not less than the maximum total downlink carrier power to noise density ratio at the ground hub, removing at least one uplink from the plurality of uplinks.

5. The method of claim 4, wherein performing the joint transmission power control process further comprises:
in response to determining that the total downlink carrier power to noise density ratio is less than the maximum total downlink carrier power to noise density ratio at the ground hub,
determining a scalar value associated with each uplink based on the maximum uplink carrier power to noise density ratio, required uplink margin, the minimum downlink carrier power to noise density ratio and required downlink margin of a corresponding transponded link,
calculating for each transponded link a revised uplink carrier power to noise density ratio by using the scalar value, the required downlink margin, and the required combined carrier power to noise density ratio,
calculating a revised total downlink power to noise density ratio based on the scalar value, the revised uplink carrier power to noise density ratios, and the transponder amplifier bandwidth,
determining whether the revised total downlink carrier power to noise density ratio is less than the maximum total downlink carrier power to noise density ratio at the ground hub, and
in response to determining that the revised total downlink carrier power to noise density ratio is not less than the maximum total downlink carrier power to noise density ratio at the ground hub, removing at least one uplink from the plurality of uplinks.

6. The method of claim 5, wherein performing the joint transmission power control process further comprises:
in response to determining that the revised total downlink carrier power to noise density ratio is less than the maximum total downlink carrier power to noise density ratio at the ground hub,
deriving a final uplink carrier power to noise density ratio for each transponded link,
evaluating a final total downlink carrier power to noise density ratio based on the derived final uplink carrier power to noise density ratios, the scalar values, and the transponder amplifier bandwidth,
evaluating a ratio between the final total downlink carrier power to noise density ratio and the maximum total downlink carrier power to noise density ratio,
if the evaluated ratio is greater than one, removing at least one uplink from the plurality of uplinks, and
if the evaluated ratio is less than or equal to one, evaluating a transmission power back-off for each uplink.

7. The method of claim 2, wherein the combined carrier power to noise density ratio for each transponded link is estimated by using a maximum likelihood estimation algorithm.

8. The method of claim 1, further comprising:
before combining the plurality of uplink signals, amplifying, by the bent pipe transponder, the plurality of uplink signals plus transponder receiver noises, and reducing outband noises by passing the amplified plurality of uplink signals through a plurality of Band Pass Filters respectively; and
after combining the plurality of uplink signals and before transmitting the combined downlink signal, amplifying the combined downlink signal by using a Travelling Wave Tube Amplifier.

9. The method of claim 1, wherein:
the plurality of communication terminals include at least one of a portable satellite communication terminal, an unmanned aircraft satellite communication terminal, a vehicle-borne communication terminal, and a ship-borne communication terminal.

10. The method of claim 1, wherein:
the set of link waveforms are specified by symbol rate, modulation type, forward error correction coding type, and coding rate;
the modulation type at least includes quadrature phase-shift keying, 8 phase-shift keying, and 16 quadrature amplitude modulation; and
the forward error correction coding type at least includes Low-density parity-check, BCH codes, and Turbo codes.

11. The method of claim 1, wherein:
each required downlink margin is obtained based on a distribution of a downlink carrier power to noise power spectrum density level; and
each required uplink margin is obtained based on a distribution of an uplink carrier power to noise power spectrum density level.

12. The method of claim 11, wherein:
the distribution of the downlink carrier power to noise power spectrum density level is obtained based at least on a downlink carrier power to noise spectrum density estimation, a free space propagation loss, a downlink weather loss, a downlink antenna de-pointing loss, and a power robbing effect at the bent pipe transponder;
the distribution of the uplink carrier power to noise spectrum density level is obtained based at least on an uplink carrier power to noise power spectrum density estimation, an uplink free space propagation loss, an uplink weather loss, an uplink antenna de-pointing loss, and an intermodulation noise at the bent pipe transponder.

13. A transponded communication system, comprising:
a plurality of communication terminals configured for transmitting a plurality of uplink signals through a plurality of uplinks respectively;
a bent pipe transponder configured for receiving and combining the plurality of uplink signals to generate a combined downlink signal, and transmitting the combined downlink signal through a combined downlink; and a ground hub configured for:
  receiving the combined downlink signal,
  extracting a plurality of downlink signals from the combined downlink signal, wherein each downlink signal corresponds to one of the plurality of uplink signals and a transponded link, each transponded link is defined as one uplink plus a corresponding downlink from the bent pipe transponder to the ground hub,
  performing a link information estimation and pre-qualification process by using the plurality of downlink signals to determine whether a selected waveform is supported by a corresponding transponded link, and
  performing a joint transmission power control process by using the plurality of downlink signals to determine whether a set of link waveforms corresponding to a plurality of transponded links are supported when required downlink margins and required margins uplink margins are satisfied.

14. The transponded communication system of claim 13, wherein the ground hub is further configured for:
  estimating a combined carrier power to noise density ratio for each transponded link including one uplink and a corresponding downlink;
  estimating a downlink carrier power to noise density ratio for each downlink;
  calculating an uplink carrier power to noise density ratio for each uplink based on the combined carrier power to noise density ratio and the corresponding downlink carrier power to noise density ratio;
  calculating a maximum uplink carrier power to noise density ratio for each uplink by using the calculated uplink carrier power to noise density ratio, a current transmission power of one communication terminal corresponding to the uplink and a maximum transmission power of the one communication terminal; and
  calculating a maximum total downlink carrier power to noise density ratio at the ground hub by using the estimated downlink carrier power to noise density ratios for the plurality of downlinks, the uplink carrier power to noise density ratios for the plurality of uplinks, and transponder amplifier bandwidth information.

15. The transponded communication system of claim 14, wherein the ground hub is further configured for:
  obtaining a required downlink margin for each downlink based on a distribution of a downlink carrier power to noise power spectrum density level, wherein the distribution of the downlink carrier power to noise power spectrum density level is obtained based at least on a downlink carrier power to noise spectrum density estimation, a free space propagation loss, a downlink weather loss, a downlink antenna de-pointing loss, and a power robbing effect at the bent pipe transponder;
  obtaining a required uplink margin for each uplink based on a distribution of an uplink carrier power to noise power spectrum density level, wherein the distribution of the uplink carrier power to noise spectrum density level is obtained based at least on an uplink carrier power to noise power spectrum density estimation, an uplink free space propagation loss, an uplink weather loss, an uplink antenna de-pointing loss, and an intermodulation noise at the bent pipe transponder; and
  performing a pre-qualification process to each transponded link by using a required uplink margin, a required downlink margin, and the maximum uplink carrier power to noise density ratio associated with the transponded link, and the maximum total downlink carrier power to noise density ratio.

16. The transponded communication system of claim 15, wherein the ground hub is further configured for:
  evaluating a minimum downlink carrier power to noise density ratio required by the ground hub for each tranponded link;
  calculating a total downlink carrier power to noise density ratio by using the plurality of minimum downlink carrier power to noise density ratios and downlink margins for the plurality of downlinks;
  determining whether the total downlink power to noise density ratio is less than the maximum total downlink carrier power to noise density ratio at the ground hub; and
  in response to determining that the total downlink carrier power to noise density ratio is not less than the maximum total downlink carrier power to noise density ratio at the ground hub, removing at least one uplink from the plurality of uplinks.

17. The transponded communication system of claim 16, wherein the ground hub is further configured for:
  in response to determining that the total downlink carrier power to noise density ratio is less than the maximum total downlink carrier power to noise density ratio at the ground hub,
    determining a scalar value associated with each uplink based on the maximum uplink carrier power to noise density ratio, required uplink margin, the minimum downlink carrier power to noise density ratio and required downlink margin of a corresponding transponded link,
    calculating for each transponded link a revised uplink carrier power to noise density ratio by using the scalar value, the required downlink margin, and the required combined carrier power to noise density ratio,
    calculating a revised total downlink power to noise density ratio based on the scalar value, the revised uplink carrier power to noise density ratios, and the transponder amplifier bandwidth,
    determining whether the revised total downlink carrier power to noise density ratio is less than the maximum total downlink carrier power to noise density ratio at the ground hub, and
    in response to determining that the revised total downlink carrier power to noise density ratio is not less than the maximum total downlink carrier power to noise density ratio at the ground hub, removing at least one uplink from the plurality of uplinks.

18. The transponded communication system of claim 17, wherein the ground hub is further configured for:
  in response to determining that the revised total downlink carrier power to noise density ratio is less than the maximum total downlink carrier power to noise density ratio at the ground hub,
    deriving a final uplink carrier power to noise density ratio for each transponded link,
    evaluating a final total downlink carrier power to noise density ratio based on the derived final uplink carrier power to noise density ratios, the scalar values, and the transponder amplifier bandwidth,
    evaluating a ratio between the final total downlink carrier power to noise density ratio and the maximum total downlink carrier power to noise density ratio, if the evaluated ratio is greater than one, removing at least one uplink from the plurality of uplinks, and if the evaluated ratio is less than or equal to one, evaluating a transmission power back-off for each uplink.

19. The transponded communication system of claim 13, wherein the bent pipe transponder is further configured for:

before combining the plurality of uplink signals, amplifying the plurality of uplink signals plus transponder receiver noises, and reducing outband noises by passing the amplified plurality uplink signals through a plurality of Band Pass Filters respectively; and after combining the plurality of uplink signals and before transmitting the combined downlink signal, amplifying the combined downlink signal by using a Travelling Wave Tube Amplifier.

20. The transponded communication system of claim 13, wherein:

the plurality of communication terminals include at least one of a portable satellite communication terminal, an unmanned aircraft satellite communication terminal, a vehicle-borne communication terminal, and a ship-borne communication terminal.

* * * * *